US010346366B1

(12) United States Patent
Jacques de Kadt et al.

(10) Patent No.: US 10,346,366 B1
(45) Date of Patent: Jul. 9, 2019

(54) MANAGEMENT OF A DATA PROCESSING PIPELINE

(71) Applicant: Amazon Technologies, Inc., Seattle, WA (US)

(72) Inventors: Christopher Richard Jacques de Kadt, Seattle, WA (US); Benjamin Warren Mercier, Seattle, WA (US); Carlos Vara Callau, Seattle, WA (US); Timothy Daniel Cole, Seattle, WA (US); Aaron Gifford Freshwater, Seattle, WA (US); Sayantan Chakravorty, Sammamish, WA (US); Allan Henry Vermeulen, Corvallis, OR (US)

(73) Assignee: Amazon Technologies, Inc., Seattle, WA (US)

( * ) Notice: Subject to any disclaimer, the term of this patent is extended or adjusted under 35 U.S.C. 154(b) by 199 days.

(21) Appl. No.: 15/275,307

(22) Filed: Sep. 23, 2016

(51) Int. Cl.
*G06F 16/18* (2019.01)
*G06F 16/23* (2019.01)
*H04L 12/18* (2006.01)

(52) U.S. Cl.
CPC ......... *G06F 16/1815* (2019.01); *G06F 16/23* (2019.01); *H04L 12/18* (2013.01)

(58) Field of Classification Search
CPC ......... G06F 17/30191; G06F 17/30345; H04L 12/18
See application file for complete search history.

(56) References Cited

U.S. PATENT DOCUMENTS

| 6,732,124 | B1* | 5/2004 | Koseki ............... G06F 11/1435 |
| 7,257,690 | B1 | 8/2007 | Baird |
| 8,612,330 | B1 | 12/2013 | Certain et al. |
| 9,055,067 | B1 | 6/2015 | Ward, Jr. et al. |
| 9,230,000 | B1 | 1/2016 | Hsieh et al. |

(Continued)

OTHER PUBLICATIONS

"Amazon Kinesis Streams," © 2016 Amazon Web Services, Inc., <https://aws.amazon.com/kinesis/streams/> [retrieved Sep. 15, 2016], 6 pages.

(Continued)

*Primary Examiner* — Jorge A Casanova
(74) *Attorney, Agent, or Firm* — Davis Wright Tremaine LLP

(57) ABSTRACT

A pipeline management service improves the operation of a processing pipeline by monitoring the operation of one or more journal services within the processing pipeline, and adjusting operational parameters of the one or more journal services. In various examples, the pipeline management service determines a model of the processing pipeline by identifying the producers and consumers associated with each of the one or more journal services, and determines a processing flow through the one or more journal services based at least in part on the identities of the associated producers and consumers. The pipeline management service acquires backlog information from each of the one or more journal services, and may adjust the operational parameters of a journal service associated with an identified processing bottleneck. In some examples, the pipeline management service adjusts capacity and reliability parameters of the one or more journal services to improve the operation of the processing pipeline.

20 Claims, 11 Drawing Sheets

(56) References Cited

U.S. PATENT DOCUMENTS

| | | |
|---|---|---|
| 9,400,607 B1 | 7/2016 | Daud et al. |
| 9,423,978 B2 * | 8/2016 | Long .................... G06F 3/0659 |
| 9,466,036 B1 | 10/2016 | Vicaire |
| 9,495,196 B2 | 11/2016 | Anderson et al. |
| 9,571,573 B1 | 2/2017 | Koorapati et al. |
| 9,734,157 B1 | 8/2017 | Brahma Raju et al. |
| 9,824,114 B1 | 11/2017 | Steinke et al. |
| 9,852,147 B2 | 12/2017 | von Muhlen et al. |
| 9,858,301 B1 * | 1/2018 | Hardy ............... G06F 17/30303 |
| 9,959,357 B2 | 5/2018 | Goel et al. |
| 9,985,848 B1 | 5/2018 | Ward, Jr. |
| 9,990,391 B1 * | 6/2018 | Cole ................ G06F 17/30371 |
| 2003/0055983 A1 | 3/2003 | Callegari |
| 2003/0061565 A1 | 3/2003 | Brendle |
| 2005/0021836 A1 | 1/2005 | Reed et al. |
| 2006/0041505 A1 | 2/2006 | Enyart |
| 2006/0184381 A1 | 8/2006 | Rice et al. |
| 2007/0033436 A1 | 2/2007 | Kingsbury et al. |
| 2007/0038714 A1 | 2/2007 | Sell |
| 2007/0266037 A1 | 11/2007 | Terry et al. |
| 2007/0271422 A1 | 11/2007 | Osaki |
| 2008/0046443 A1 | 2/2008 | Fachan et al. |
| 2008/0071853 A1 | 3/2008 | Mosier et al. |
| 2009/0132671 A1 | 5/2009 | Chkodrov et al. |
| 2009/0133039 A1 | 5/2009 | Chkodrov et al. |
| 2010/0058349 A1 | 3/2010 | Diwakar et al. |
| 2010/0262860 A1 | 10/2010 | Sargor et al. |
| 2011/0295722 A1 | 12/2011 | Reisman |
| 2012/0084113 A1 | 4/2012 | Brandwine et al. |
| 2012/0084443 A1 | 4/2012 | Theimer et al. |
| 2012/0323644 A1 | 12/2012 | Custer |
| 2013/0018963 A1 | 1/2013 | Brauff et al. |
| 2013/0042005 A1 | 2/2013 | Boss et al. |
| 2013/0111261 A1 | 5/2013 | Dalton |
| 2013/0198319 A1 | 8/2013 | Shen et al. |
| 2014/0280956 A1 | 9/2014 | Shu et al. |
| 2015/0006733 A1 | 1/2015 | Khan et al. |
| 2015/0040131 A1 | 2/2015 | Shan et al. |
| 2015/0058557 A1 | 2/2015 | Madhusudana et al. |
| 2015/0248253 A1 | 9/2015 | Kim et al. |
| 2015/0277987 A1 | 10/2015 | Di Balsamo et al. |
| 2016/0253195 A1 | 9/2016 | Banzhaf et al. |
| 2016/0292179 A1 | 10/2016 | von Muhlen et al. |
| 2017/0257322 A1 | 9/2017 | Nagao |
| 2017/0286517 A1 | 10/2017 | Horowitz et al. |

OTHER PUBLICATIONS

Kreps, J., "The Log: What Every Software Engineer Should Know About Real-Time Data's Unifying Abstraction," Linkedin.com, Dec. 16, 2013, https://engineering.linkedin.com/distributed-systems/log-what-every-software-engineer-sh . . . > [retrieved Sep. 15, 2016], 29 pages.

"Leader Election Pattern," © 2016 Microsoft, <https://msdn.microsoft.com/en-us/library/dn568104(d=printer).aspx> [retreived Sep. 15, 2016], 8 pages.

* cited by examiner

MANAGEMENT OF A DATA PROCESSING PIPELINE

CROSS REFERENCE TO RELATED APPLICATIONS

This application incorporates by reference for all purposes the full disclosure of U.S. patent application Ser. No. 15/275,296, filed Sep. 23, 2016, entitled "JOURNAL SERVICE WITH NAMED CLIENTS," U.S. patent application Ser. No. 15/275,300, filed Sep. 23, 2016, entitled "MANAGEMENT OF ALTERNATIVE RESOURCESR," and U.S. patent application Ser. No. 15/275,302, filed Sep. 23, 2016, entitled "RESOURCE MANAGER."

BACKGROUND

A data processing system may be arranged in a variety of ways. In some data processing systems, a data processing task is divided into a number of subtasks, and an individual service is implemented to perform each subtask. Each service in the resulting collection of services may act as a consumer and/or a producer of various types of data. Interconnections between the services may be facilitated through the use of a queue structure called a journal. The journal acts as a queue that accepts data in the form of journal entries from one or more producer services ("producer") and provides the journal entries to a corresponding consumer service ("consumer"). In some data processing systems, the journals and the services are configured to form an end-to-end processing pipeline.

Variations in the processing capability and reliability of individual services in the pipeline may impose limitations on the operation of the pipeline overall. When building a processing pipeline, system administrators attempt to assign an appropriate producer and an appropriate consumer to each journal in the pipeline. However, as the number of alternative producers and consumers increases, and the number of journals in the pipeline increases, a large number of pipeline configurations are possible. Therefore, the efficient management and assignment of consumer/producer resources in a pipelined environment is particularly difficult.

BRIEF DESCRIPTION OF THE DRAWINGS

Various techniques will be described with reference to the drawings, in which.

DETAILED DESCRIPTION

Figure 1:
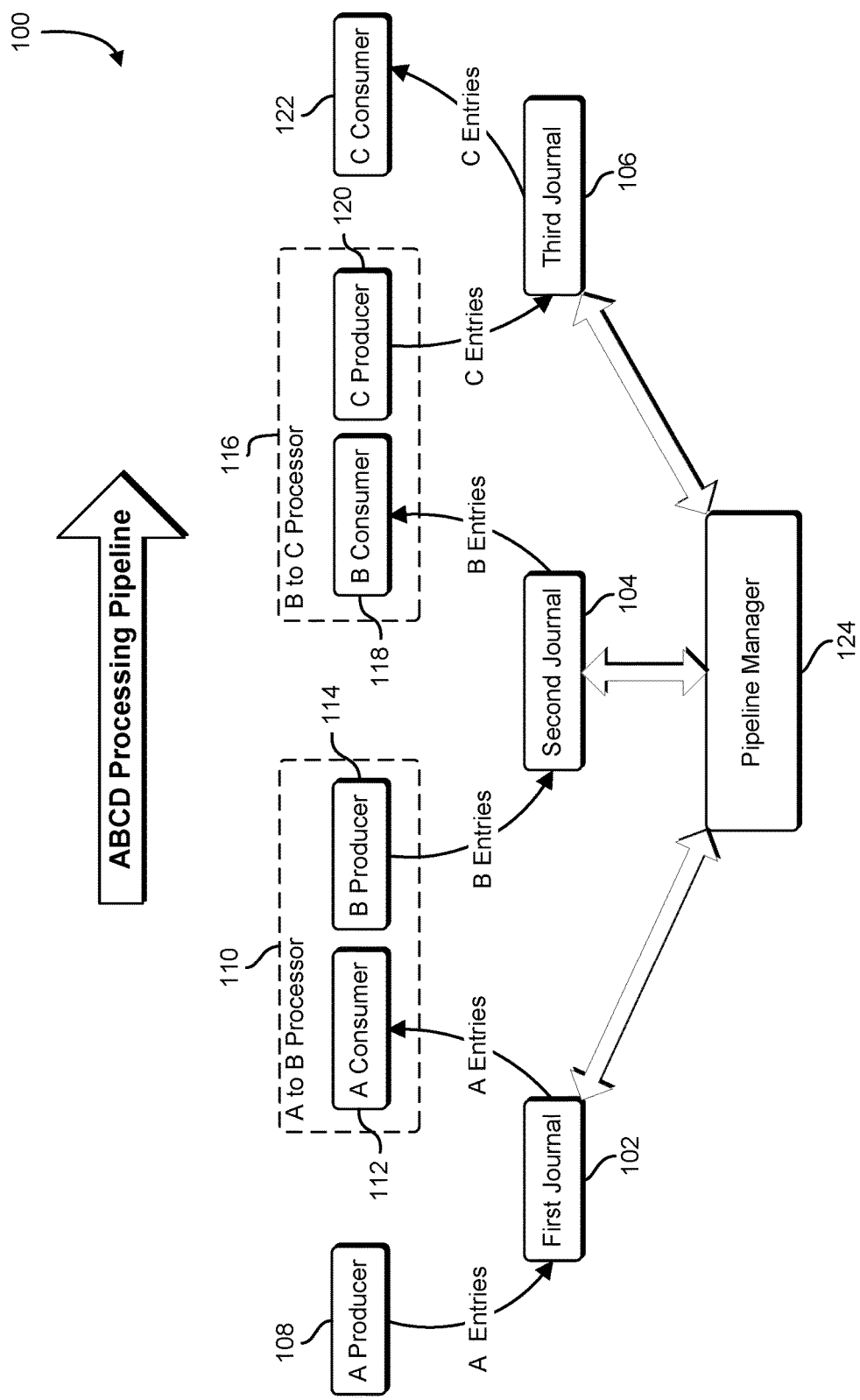
FIG. 1 shows an illustrative example of an environment in which various embodiments may be practiced.

The current document describes a pipeline manager that improves the operation of a processing pipeline made up of a series of journal services by adjusting the operation of consumers and producers associated with journal services in the pipeline. The processing pipeline is a computing system made up of a number of consumers and producers that are connected via the journal services. The first journal service in the processing pipeline is supplied with journal entries by an initial producer, and journal events from the last journal service in the processing pipeline are consumed by a final consumer. Interconnections between journal services are facilitated by hybrid consumer/producer entities that consume journal entries of one type and produce another type of journal entry. For example, if a first journal service receives journal entries of a first type from an initial producer, and a second journal service provides journal entries of a second type to a final consumer, a transfer of processed data between the first journal service and the second journal service may be achieved using an intermediate consumer and an intermediate producer. The intermediate consumer retrieves journal entries of the first type from the first journal service, and the intermediate provider provides journal entries of the second type to the second journal service.

The pipeline manager is a service implemented on a computer system that communicates with the series of journal services associated with the pipeline. In some examples, the pipeline manager is implemented on a shared computer system with the series of journal services and communicates with the series of journal services via interprocess communication ("IPC"). In another example, the pipeline manager is implemented on a remote server, and communicates with the series of journal services via a network interface using remote procedure calls ("RPC"). The pipeline manager develops a model for the processing pipeline by interrogating the journal services and implying a pipeline structure from the set of consumers and producers associated with each journal service. The journal services provide the pipeline manager with performance metrics including capability and reliability measures associated with consumers and producers, journal-entry backlog information, available journal-entry storage space, and journal-entry throughput rates. The pipeline manager uses this information to identify processing bottlenecks, inefficiencies, or vulnerabilities to the processing pipeline. In various implementations, the pipeline manager instructs select journal services to modify reliability or capacity requirements to improve overall measures associated with the pipeline.

The pipeline includes processing segments where an intermediate consumer and an intermediate producer are combined with other processing components to form a hybrid entity that consumes journal entries of a first type and produces journal entries of a second type. In one example, the hybrid entity includes an intermediate consumer that processes the information contained in the journal entry of the first type, and using the information, produces a journal entry of the second type which is provided to an intermediate producer. In another example, the hybrid entity includes an intermediate consumer that sends information derived from the journal entry of the first type to an intermediate producer, and the intermediate producer generates a journal entry of the second type which is provided to the second journal service. In yet another example, the intermediate consumer and the intermediate producer are combined to produce a hybrid entity capable of both consuming journal entries of the first type and producing journal entries of the second type. The hybrid entity may include additional business logic that produces journal entries of the second type based at least in part on information obtained from the journal entries of the first type. In yet another example, the intermediate consumer and the intermediate producer interact with a third-party service to convert journal entries of the first type into journal entries of the second type.

Reliability of the processing pipeline may be improved by providing alternate resources for the active producers and active consumers in the pipeline. Alternate producers and alternate consumers may be provided for individual active producers or active consumers. For example, a particular alternate producer may have one or more associated alternate producers that are linked in a sequence that defines a fallback order. In another example, an active consumer and an active producer share a set of alternate resources that may be called upon to replace a failed active consumer or a failed active producer. Additional information describing the use and management of alternate resources may be found in U.S. patent application Ser. No. 15/275,300, filed Sep. 23, 2016, entitled "MANAGEMENT OF ALTERNATIVE RESOURCES" the content of which is incorporated by reference herein in its entirety. Additional information describing the use and management of producers and consumers may be found in U.S. patent application Ser. No. 15/275,296, filed Sep. 23, 2016, entitled "JOURNAL SERVICE WITH NAMED CLIENTS" the content of which is incorporated by reference herein in its entirety.

Each journal service in a pipeline maintains a journal that holds journal entries in an order. Access to the journal entries is controlled by one or more named cursors. Each cursor identifies a location within the journal. When a producer adds journal entries to the journal, the journal entries may be appended to the end of the Journal. In some implementations, when a journal adds a journal entry to the journal, a corresponding producer cursor is updated when the journal entry is committed to the journal. When a lead consumer requests journal entries from the journal service, the journal service provides the lead consumer with journal entries at the journal location indicated by the particular named consumer cursor, and the corresponding named consumer cursor is updated as a result of the lead consumer indicating that the provided journal entries have been successfully processed.

FIG. 1 shows an illustrative example of an environment in which various embodiments may be practiced. A diagram 100 shows a processing pipeline includes a number of consumers and producers linked together with a number of journal services. A consumer is a service or application hosted by a computer system which retrieves journal entries from a journal service, processes the retrieved journal entries, and notifies the journal service that the retrieved journal entries have been processed. The journal retains a number of journal entries in a determined order, and maintains one or more cursors that indicate locations within the journal where new journal entries may be added or where stored journal entries may be provided from. A cursor is a variable that identifies a particular journal entry in the journal. The cursor is associated with the journal, and the value of the cursor may be updated to move the cursor forward or backward through a sequence of journal entries in response to journal entries being added, removed, or otherwise processed. In some examples, the journal stores journal entries in a block of addressable memory and a cursor is a pointer to a location in the block of addressable memory.

The cursor is updated by incrementing or decrementing the value of the cursor an amount corresponding to the size, in addressable units, of a journal entry. In another example, a cursor is an index to an ordered list of journal entries. The cursor is updated by adding or subtracting a count to the index value. In yet another example, a cursor is a pointer to a journal entry, and the ordering of the journal entries is defined using links between journal entries. The cursor is updated by setting the cursor to the value of the link to the next journal entry or the previous journal entry. Each cursor can be a production cursor or a consumption cursor. Production cursors record a location in the journal where new journal entries can be written by a producer.

Consumption cursors indicate a processing checkpoint from which corresponding named consumers are drawing journal entries. Each cursor is associated with a name. When consumers or producers interact with a journal, they may specify a name of a cursor. The cursor name indicates a location within the journal with which the consumer or producer wishes to interact. As consumers or producers confirm interactions with the journal, an associated journal service updates the appropriate cursor.

The processing pipeline includes a first journal service 102, a second journal service 104, and a third journal service 106. Each journal service receives journal entries of a particular type from a producer service, retains the journal entries in a queue, and provides the journal entries to a consumer of the particular type of journal entry. One or more of the journal services may be hosted on a single computer system. Individual journal services may be hosted on a computer system, a cluster of computer systems, or a virtual computer system. Producers and consumers may operate as separate entities, or may operate as hybrid entities performing both consumer and producer functions. For example, a producer of "A" entries 108 produces journal entries of a first type, and sends the journal entries to the first journal service 102. The first journal receives the journal entries, stores the journal entries, and updates and associated production cursor. The producer of "A" entries 108 may operate independently of other producers and consumers in the processing pipeline. A first hybrid entity 110 includes both a consumer of "A" entries 112 and a producer of "B" entries 114. The consumer of "A" entries 112 retrieves journal entries from the first journal service 102. The first journal service 102 provides the journal entries to the consumer of "A" entries 112 and updates the consumption cursor as a result of a confirmation sent by the consumer of "A" entries 112. The first hybrid entity 110 performs business logic that processes information associated with the "A" journal entries and produces results that cause the producer of "B" entries 114 to produce journal entries and submit them to the second journal service 104. The second journal service 104 receives the journal entries from the producer of "B" entries 114, and updates a production cursor as journal entries are stored in the journal.

A second hybrid entity 116 includes both a consumer of "B" entries 118 and a producer of "C" entries 120. The consumer of "B" entries 118 retrieves journal entries from the second journal service 104. The second journal service 104 provides the journal entries to the consumer of "B" entries 118 and updates and associated consumption cursor as a result of a confirmation sent by the consumer of "B" entries 118. The second hybrid entity 116 performs additional business logic that processes information associated with the received "B" journal entries and produces results that cause the producer of "C" entries 120 to produce journal entries and submit the journal entries to the third journal service 106. The third journal service 106 receives the journal entries from the producer of "C" entries 120, and updates an associated production cursor as journal entries are stored in the journal.

A consumer of "C" entries 122 requests journal entries from the third journal service 106. In response to the request, the third journal service 106 provides the journal entries to the consumer of "C" entries 122, and updates a corresponding cursor in response to a confirmation sent by the consumer of "C" entries 122. The consumer of "C" entries 122 may perform additional processing that produces an end result for the processing pipeline. In some examples, the consumer of "C" entries 122 may provide the entries to another entity that produces the end results for the processing pipeline.

A pipeline manager 124 communicates with the journal services in the processing pipeline to acquire operational information related to the pipeline. The operational information may include the identity of consumers, producers, and hybrid entities associated with each journal service, the amount of free storage space available to each journal service, and the backlog of journal events retained by each journal service. In some examples, the pipeline manager 124 uses the identity of consumers, producers, and hybrid entities associated with each journal device to generate a model that describes the flow of information through the pipeline. The pipeline manager 124 analyzes the operational information and identifies performance bottlenecks, operational inefficiencies, and other opportunities for improvement. Based on the identified opportunities for improvement, the pipeline manager 124 may adjust the operational parameters of the journal services and/or the operational parameters of the consumers and producers associated with the journal services.

Figure 2:
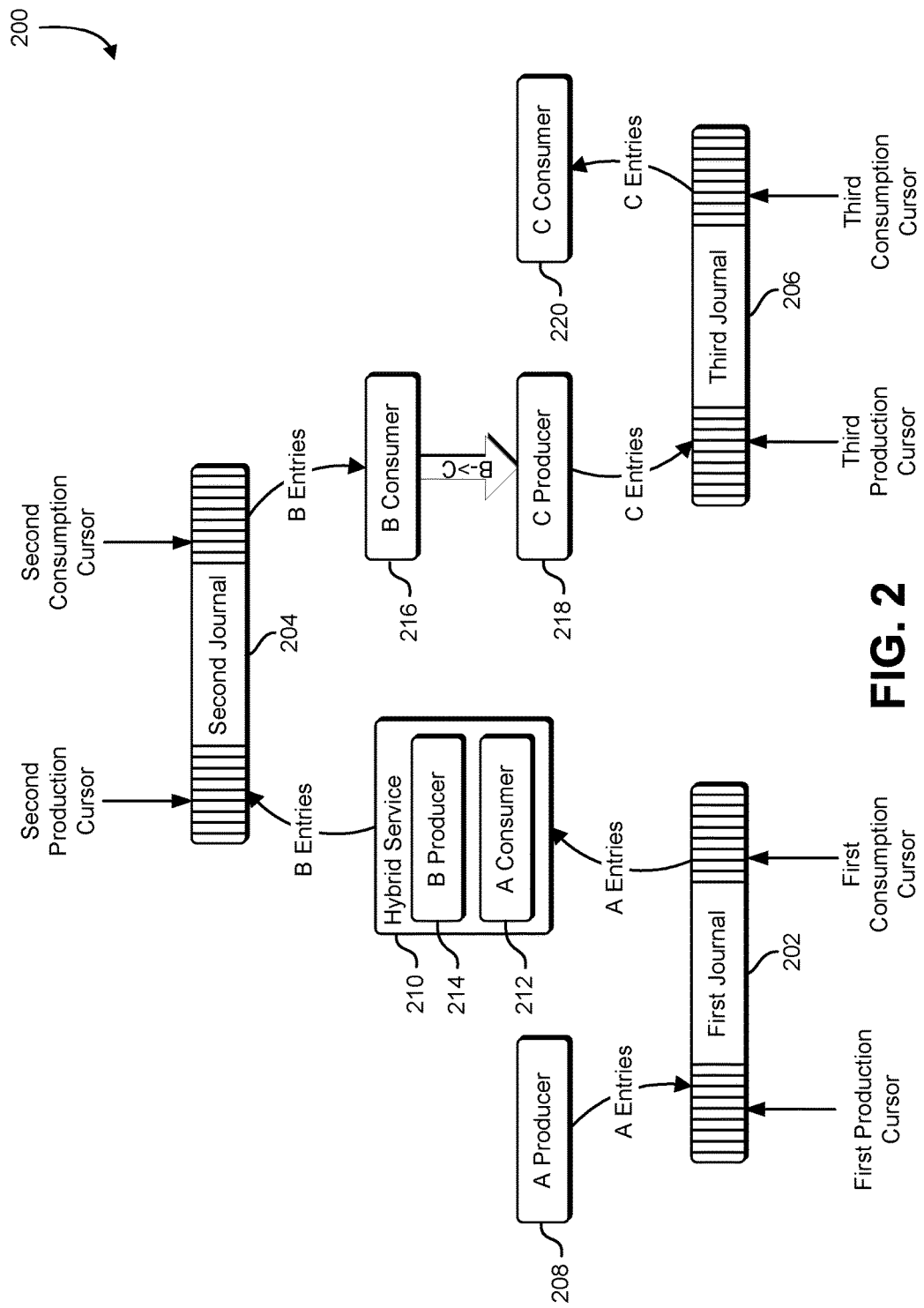
FIG. 2 shows an illustrative example of a processing pipeline that includes a variety of producers and consumers connected via a number of journal services.

FIG. 2 shows an illustrative example of a processing pipeline that includes a variety of producers and consumers connected via a number of journal services. A diagram 200 shows a processing pipeline that includes a first journal 202, a second journal 204, and a third journal 206. The first journal maintains a first production cursor and the first consumption cursor that identify locations within the first journal 202 where journal entries may be stored and retrieved. An initial producer 208 produces A-type journal entries, and submits the A-type journal entries to the first journal 202. The first journal 202 stores the A-type journal entries and updates the first production cursor to the next available location in the first journal 202. If the first production cursor is represented as an index, the first production cursor may be updated by incrementing the index. If the first production cursor is represented as a memory location, and the journal entries are stored in a contiguous block of addressable memory, the first production cursor may be updated by adding a value corresponding to the size of the A-type journal entries to the first production cursor. If the first production cursor is a pointer, and the journal entries are stored as a linked list, the first production cursor may be updated by setting the value of the first production cursor to a value associated with a link to the next journal entry.

The pipeline includes a hybrid service 210 that includes a consumer of A-type journal entries 212 and a producer of B-type journal entries 214. The hybrid service is a service hosted by a computer system that performs functions of one or more consumers and/or producers, and which is identifiable using a shared identifier. The hybrid service 210 may be hosted on a single computer server, server cluster, virtual server, container runtime, or other environment. The hybrid service includes one or more interfaces such as network, memory, or programming interfaces that allow the hybrid service 210 to interact with at least two journal services. The consumer of A-type journal entries 212 retrieves journal entries from the first journal 202, and provides the retrieved journal entries to the hybrid service 210 for processing. The hybrid service 210 causes the producer of B-type journal entries 214 to create and submit B-type journal entries to the second journal 204. The hybrid service 210 acts as a conduit between the first journal 202 and the second journal 204. The hybrid service 210 may perform various business operations that consume A-type journal entries and produce B-type journal entries. For example, if the A-type journal entries include order information, and the B-type journal entries include shipping-label information, the hybrid service 210 would process the order information from the A-type journal entry and generate the shipping-label information. The relationship of A-type journal entries to B-type journal entries is not limited to a one-to-one relationship. In some examples, the hybrid service 210 converts A-type journal entries to B-type journal entries. In another example, the hybrid service 210 generates a B-type journal entry in response to receiving a plurality of A-type journal entries. In yet another example, the hybrid service 210 generates a plurality of B-type journal entries as a result of receiving a particular A-type journal entry. As the hybrid service 210 retrieves journal entries from the first journal 202, the hybrid service 210 confirms processing of the received journal entries. As a result of receiving the confirmation from the hybrid service 210, the first journal 202 updates the first consumption cursor to the location of the next available journal entry. As a result of receiving the B-type journal entries from the producer of B-type journal entries 214, the second journal 204 updates the second production cursor to the next available storage location within the second journal 204.

B-type journal entries are retrieved from the second journal 204 by a consumer of B-type journal entries 216. The consumer of B-type journal entries 216 works in coordination with a producer of C-type journal entries 218 to link the second journal 204 to the third journal 206. In some examples, the consumer of B-type journal entries 216 generates information that is transmitted to the producer of the C-type journal entries 218. The information causes the producer of the C-type journal entries 218 to optionally generate one or more C-type journal entries which are provided to the third journal 206. For example, the B-type journal entry may be information encoded in ASCII format, and the consumer of B-type journal entries 216 converts the information stored in ASCII format into information in UTF-16 format. The information in UTF-16 format is provided to the producer of C-type journal entries 218, and the producer of C-type journal entries 218 generates a C-type journal entry which is provided to the third journal 206. In another example, the B-type journal entries and C-type journal entries contain matching information, but are transmitted via different communication protocols, and the consumer of B-type journal entries 216 and the producer of C-type journal entries 218 are configured to bridge between otherwise incompatible communication protocols or mediums. In one example, B-type journal entries are retrieved by the consumer of B-type journal entries 216 from the second journal 204 via an Ethernet network connection. The consumer of B-type journal entries 216 transfers the journal entries to the producer of C-type journal entries 218 via a common backplane, a shared memory space, or other shared interface, and the producer of C-type journal entries 218 provides the journal entries to the third journal 206 via a token ring network connection. When a consumer of B-type journal entries 216 retrieves journal entries from the second journal 204, the consumer of the B-type journal entries 216 confirms the processing of the retrieved journal entries, and the second journal 204 updates the second consumption cursor accordingly. When the producer of C-type journal entries 218 submits journal entries to the third journal 206, the third journal updates the third production cursor accordingly.

A final consumer 220 retrieves the C-type journal entries from the third journal 206. The final consumer performs any final business logic and formatting to produce a pipeline result. The pipeline result may be stored or provided to an output console for use by an end-user or administrator. The final consumer 220 confirms the receipt of C-type journal entries, causing the third journal 206 to update the consumption cursor appropriately.

Figure 3:
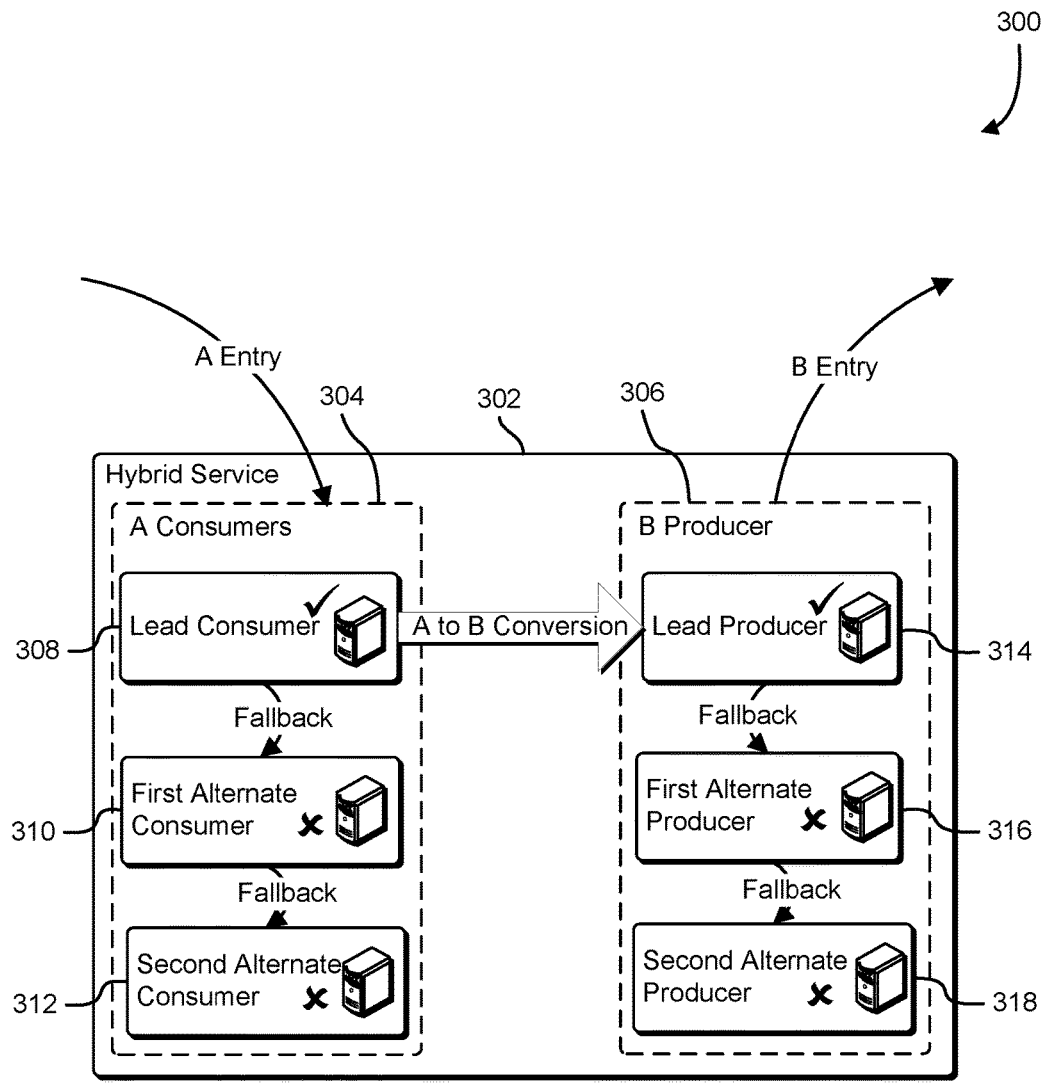
FIG. 3 shows an illustrative example of a hybrid service that includes a set of consumers and a set of producers configured to retrieve events of a first type from a first journal service and provide events of a second type to a second journal service.

FIG. 3 shows an illustrative example of a hybrid service that includes a set of consumers and a set of producers configured to retrieve events of a first type from a first journal service and provide events of a second type to a second journal service. A diagram 300 shows a hybrid service 302 that is capable of acting as both a producer and a consumer of journal entries. The hybrid service 302 includes a set of consumers 304 and a set of producers 306. Journal entries of the first type are retrieved by the hybrid service, and information based at least in part on the journal entries of the first type is processed in order to generate a number of journal entries of the second type. The journal entries of the second type are provided to the second journal service by the set of producers 306. In some implementations, the alternate resources and backup order associated with the set of consumers 304 and the set of producers 306 is managed by the hybrid service. In another implementation, the alternate consumers associated with the set of consumers 304 are managed by the first journal service, and the alternate producers associated with the set of producers 306 are managed by the second journal service.

The set of consumers 304 includes a lead consumer 308, a first alternate consumer 310, and a second alternate consumer 312. The lead consumer 308 is allowed to retrieve journal entries of the first type from the first journal service, and the alternate consumers are prevented from retrieving journal entries of the first type from the first journal. In various examples, the lead consumer 308 is designated as the lead consumer by the first journal service. Links between the lead consumer 308, the first alternate consumer 310, and second alternate consumer 312 establish an order in which alternate resources will be called upon in the event the lead consumer 308 fails. The hybrid service 302 includes an interface that is accessible to the first journal service in the second journal service. The interface allows journal services to acquire information that identifies the hybrid service 302, the set of consumers 304 and the set of producers 306.

The set of producers 306 includes a lead producer 314, a first alternate producer 316, and a second alternate producer 318. The lead producer 314 produces journal entries of the second type, and submits the journal entries to the second journal service. The second journal service accepts journal entries from the lead producer 314. If the first alternate producer 316 or the second alternate producer 318 attempts to submit journal entries to the second journal service, the second journal service will reject the journal entries. The lead producer 314 is designated as a lead producer by the second journal service. Links between the lead producer 314, the first alternate producer 316, and the second alternate producer 318 defined an order in which alternate resources will be called upon in the event that the lead producer 314 fails or is replaced for any reason.

A journal or other resource manager may substitute alternate resources for lead resources, change the order of alternate resources, or add or remove alternate resources from a pool of consumers or producers in order to improve the processing capacity of the lead resource or improve the reliability of the resource pool as a whole. Information describing how pools of consumers and producers may be managed by a resource manager such as a journal service may be found in U.S. patent application Ser. No. 15/275,302, filed Sep. 23, 2016, entitled "RESOURCE MANAGER" the content of which is incorporated by reference herein in its entirety.

Figure 4:
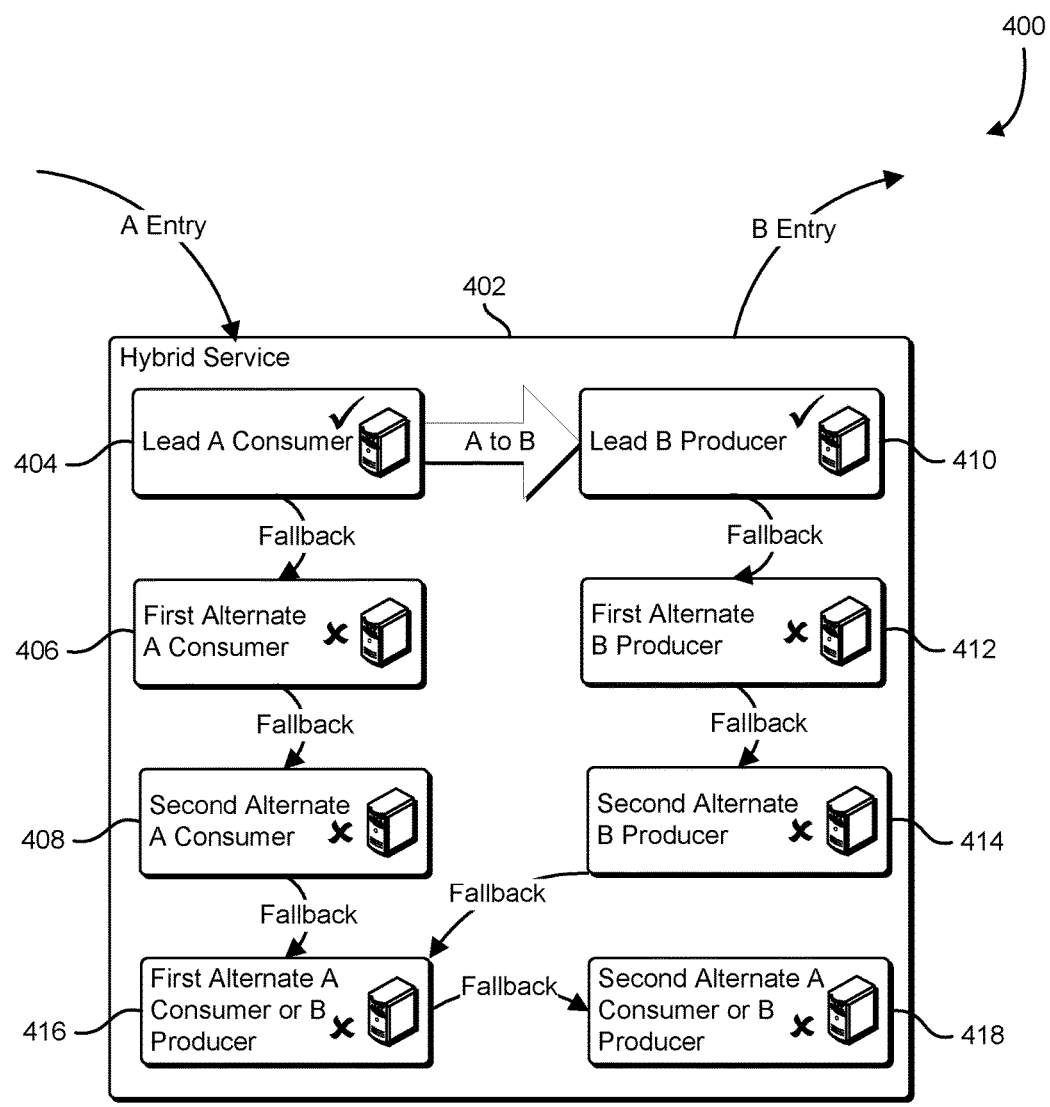
FIG. 4 shows an illustrative example of a hybrid service that includes a set of consumers and a set of producers that share a number of versatile alternate resources capable of replacing either a consumer or a producer.

FIG. 4 shows an illustrative example of a hybrid service that includes a set of consumers and a set of producers that share a number of versatile alternate resources capable of replacing either a consumer or a producer. A diagram 400 illustrates hybrid service 402 that consumes journal entries of a first type from a first journal service and produces journal entries of a second type that are sent to a second journal service. The hybrid service 402 includes a lead consumer 404, a first alternate consumer 406, and a second alternate consumer 408. The first alternate consumer 406 and the second alternate consumer 408 may assume the functions of the lead consumer 404 if the lead consumer 404 fails. The hybrid service 402 includes a lead producer 410, the first alternate producer 412, and a second alternate producer 414. The first alternate producer 412 and the second alternate producer 414 may assume the functions of the lead producer 410 if the lead producer 410 fails. A series of links from the lead consumer 404 and from the lead producer 410 establish an order in which alternate resources are relied upon to replace a failing lead resource.

The hybrid service 402 includes a number of versatile alternate resources that are capable of replacing more than one consumer or producer. In some examples, a versatile alternate resource is capable of assuming the functions of either a lead consumer or lead producer. In another example, a versatile alternate resource is capable of assuming the functions of two different types of consumers. In yet another example, a versatile alternate resource is capable of assuming the functions of two different types of producers. The hybrid service 402 includes a first versatile alternate resource 416 and a second versatile alternate resource 418 that are capable of performing the functions of either the lead consumer 404 or the lead producer 410.

A consumer fallback chain is associated with the lead consumer 404 and defines an order in which alternate resources will be activated to replace a failure of the lead consumer 404. The consumer fallback chain may be represented using an ordered array, an ordered list, or is a sequence of pointers linking records associated with the consumer resources. In the example shown in FIG. 4, the consumer fallback chain specifies that if the lead consumer 404 fails, the first alternate consumer 406 will be activated, followed by the second alternate consumer 408, followed by the first versatile alternate resource 416, and followed by the second versatile alternate resource 418. A producer fallback chain is associated with the lead producer 410. In the example shown in FIG. 4, the producer fallback chain specifies that if the lead producer 410 fails, the first alternate producer 412 will be activated, followed by the second alternate producer 414, followed by the first versatile alternate resource 416, and followed by the second versatile alternate resource 418. In various examples, the order in which alternate resources are activated is configured to prioritize the activation of non-versatile alternate resources over versatile alternate resources. A particular versatile alternate resource may be present in more than one fallback chain. If the particular versatile alternate resource is activated, fallback chains that include the particular versatile alternate resource are updated to remove the particular versatile alternate resource.

Figure 5:
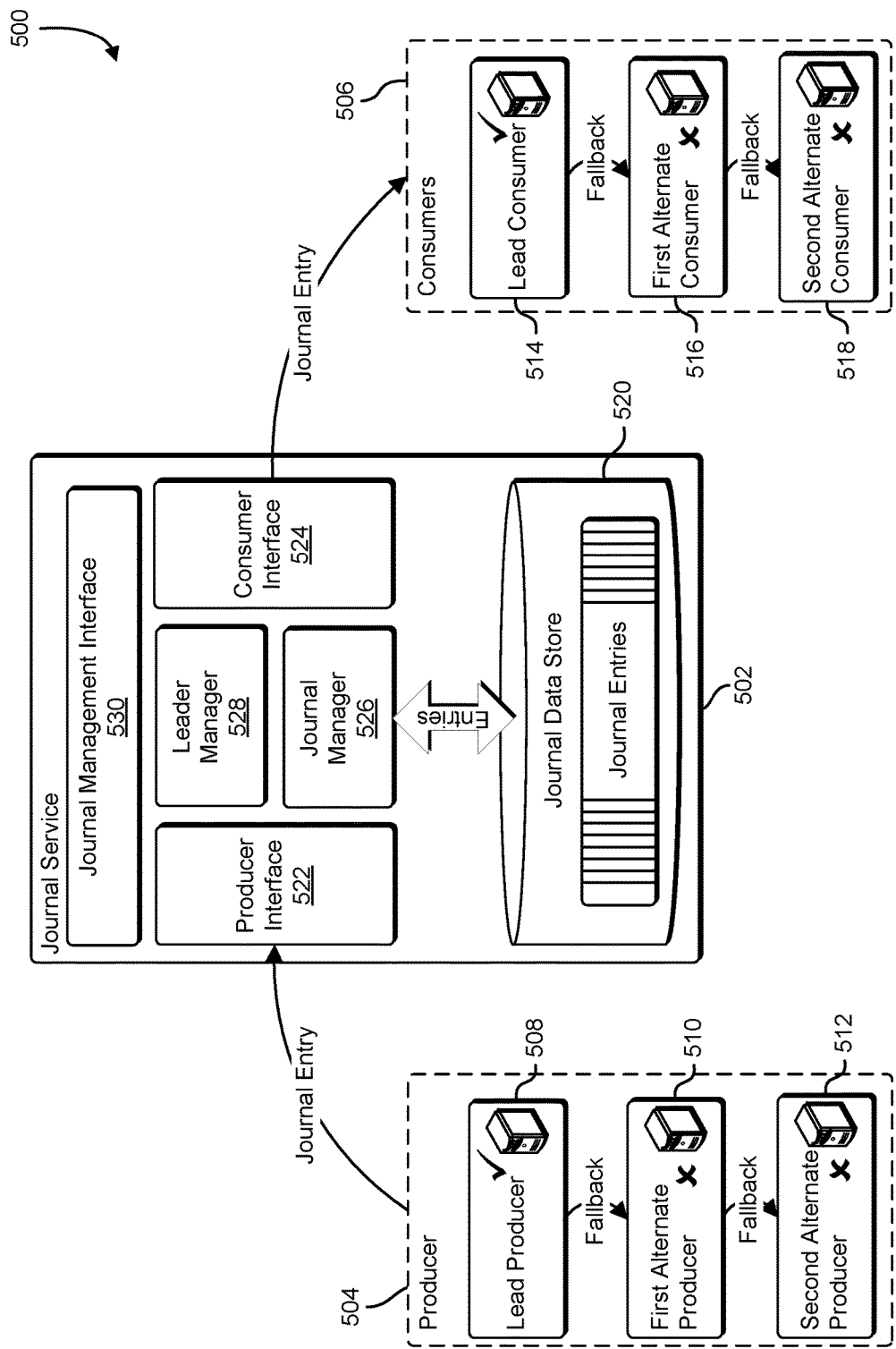
FIG. 5 shows an illustrative example of a journal service that manages a set of producers that supply journal entries and a set of consumers that consume journal entries.

FIG. 5 shows an illustrative example of a journal service that manages a set of producers that supply journal entries and a set of consumers that consume journal entries. A block diagram 500 illustrates a portion of a pipeline that includes a journal service 502 that receives journal entries from a set of producers 504, and provides journal entries to a set of consumers 506. The journal service may be implemented using a computer system configured with either circuitry and/or executable instructions that causes the computer system to perform the functions of the journal service. A journal queue is maintained by the journal service 502. Journal entries are provided to the journal service 502 by a lead producer in the set of producers 504, and journal entries are retrieved from the journal service 502 by a lead consumer in the set of consumers 506. The journal service 502 maintains a production cursor which indicates a position within the journal where new journal entries may be added, and a consumption cursor which indicates a journal position within the journal from which journal entries are retrieved and provided to the set of consumers 506. The values of the production cursor and the consumption cursor represent checkpoints for the production and consumption of journal entries by producers and consumers. The journal service 502 updates the production cursor as the addition of each new journal entry is confirmed by the journal service. The journal service 502 updates the consumption cursor after a consumer confirms that the provided journal entry has been processed by the consumer. In many examples, the journal service 502 selects one producer from the set of producers 504 to act as a lead producer, and selects one consumer from the set of consumers 506 to act as a lead consumer.

The set of producers 504 includes a lead producer 508, a first alternate producer 510, and a second alternate producer 512. The journal service 502 may receive conflicting requests to add journal entries to the journal from a plurality of producers in the set of producers 504. The journal service 502 resolves this problem by designating one producer from the set of producers 504 as a lead producer, and designates the remaining producers as alternate producers. Alternate producers are not permitted to add journal entries to the journal. In the example shown in FIG. 5, the journal service designates the lead producer 508 as the lead producer, and designates the first alternate producer 510 and the second alternate producer 512 as alternate producers. In some examples, alternate producers are maintained in a pool of alternate producers. In another example, alternate producers are maintained in an ordered list, and a series of fallback links defines an order in which alternate producers may be called upon by the journal service. In the example shown in FIG. 5, if the lead producer 508 fails, the journal service will replace the lead producer 508 with the first alternate producer 510. If the first alternate producer 510 fails, the journal service will replace the first alternate producer 510 with the second alternate producer 512.

The set of consumers 506 includes a lead consumer 514, a first alternate consumer 516, and a second alternate consumer 518. The journal service may receive competing requests for journal entries from consumers within the set of consumers 506. The journal service designates a particular consumer from within the set of consumers 506 to act as a lead consumer. The remaining consumers in the set of consumers 506 are designated as alternate consumers. Requests for journal entries received from alternate consumers are not granted. In the example shown in FIG. 5, the journal service 502 designates the lead consumer 514 as the lead consumer, and designates the first alternate consumer 516 and the second alternate consumer 518 as alternate consumers. Alternate consumers may be maintained in a pool of available alternate consumers. A fallback sequence may be defined for alternate consumers. The fallback sequence may be defined by assigning a fitness score to each alternate consumer, or by maintaining fallback links between the lead consumer and a sequence of alternate consumers. In the example shown in FIG. 5, fallback links link the lead consumer 514 to the first alternate consumer 516, and the first alternate consumer 516 to the second alternate consumer 518. If the lead consumer 514 fails, the journal service will replace the lead consumer with the first alternate consumer 516. If the first alternate consumer 516 fails, the journal service will replace the first alternate consumer 516 with the second alternate consumer 518.

Alternate consumers and alternate producers are blocked by the journal service 502 from receiving or sending journal entries to the journal service 502. While blocked, alternate consumers and alternate producers may be held in a variety of waiting states. In some examples, a alternate consumer or alternate producer periodically polls the journal service 502 by attempting to send or receive a journal entry. In another example, a alternate consumer or alternate producer may enter a suspended state and wait for a signal from the journal service 502 that causes the alternate consumer or alternate producer to reactivate. In yet another example, alternate consumers or producers may be suspended and swapped to nonvolatile storage. In yet another example, the journal service 502 sends, to each alternate producer and alternate consumer, an indication of where the particular alternate producer or alternate consumer is in the fallback sequence. Alternate producers and consumers early in the fallback sequence remain in an active state, and periodically poll the journal service 502 with requests to submit or receive journal entries. Alternate producers and consumers later in the fallback sequence enter a suspended state, swap to nonvolatile storage, or even terminate. In some examples, the journal service may indicate, to a alternate producer or alternate consumer, a particular idle action.

In some examples, the journal service creates additional producer and consumer resources which may be used as lead or alternate resources. Additional producer and consumer resources may be generated to improve the reliability of the pipeline segment, or to improve the performance of the lead producer or lead consumer. In some implementations, the journal service determines a number of shared dependencies a set of tumors or producers, and generates alternate resources that do not share one or more of the shared dependencies to increase the reliability of the resource pool as a whole. The journal service may create additional producer and consumer resources by acquiring computing resources from computing service providers, connected data centers, and other resources, and configures the computing resources to perform the functions of a alternate resource. In some examples, the journal service determines a set of requirements for the additional consumers or producers, and provides the determined requirements to a computing resource service provider which returns a handle or identifier to a newly configured alternate resource.

The journal service 502 maintains the journal in a journal data store 520. The journal data store 520 may be maintained in volatile or nonvolatile memory such as semiconductor RAM, flash memory, disk storage, or rewritable optical storage. In some examples, the journal is maintained in linearly addressable memory, and one or more cursors are maintained as pointers to locations within the linearly addressable memory. In another example, the journal is maintained in an ordered linked list, and one or more cursors are maintained as pointers to individual entries in a linked list. In yet another example, the journal is maintained in a database table by a database engine, and named cursors indicating locations within the database table are maintained by the database engine. The journal service 502 implements a producer interface 522 and a consumer interface 524. The producer interface 522 provides an interface to producers and alternate producers for submitting journal entries and, if appropriate, for enforcing the selection of a lead producer from a number of potential lead producers. The consumer interface 524 provides an interface to consumers and alternate consumers for retrieving journal entries and, if appropriate, enforcing the selection of the lead consumer from a number of potential lead consumers.

The journal service 502 includes a journal manager 526 that maintains the journal in the journal data store 520. The journal manager 526 also maintains a collection of named cursors. The collection of named cursors may include named producer cursors and named consumer cursors. The journal manager 526 interacts with the producer interface 522 and the consumer interface 524 to retrieve journal entries requested by consumers and store journal entries provided by producers. When a consumer submits a request via the consumer interface 524, the consumer specifies a particular named cursor with the request. The consumer interface 524 forwards the request to journal manager 526, and based on the named cursor specified by the consumer, the journal manager 526 retrieves a particular journal entry from the journal data store 520. The journal manager 526 returns the journal entry to the consumer via the consumer interface 524. The consumer returns a confirmation to the journal service 502 which is received by the journal manager 526. As a result of receiving the confirmation from the consumer, the journal manager 526 advances the named cursor in preparation for the next consumer request. When a producer submits a journal entry via the producer interface 522, the producer identifies a particular named production cursor. The producer interface 522 forwards the request to the journal manager 526, and the journal manager 526 adds the journal entry to the journal maintained in the journal data store 520. The new journal entry is stored at a location indicated by the named production cursor. The journal manager 526 updates the named production cursor and returns a confirmation to the producer via the producer interface 522.

The journal service 502 includes a leader manager 528. The leader manager 528 coordinates the selection of a lead producer and a lead consumer from a set of potential lead producers and a set of potential lead consumers. The leader manager 528 communicates with producers and consumers via the producer interface 522 and the consumer interface 524. Once a leader has been established for a particular named cursor, the leader manager 528 authorizes requests from the established leader relating to the particular named cursor and rejects requests relating to the particular named cursor from other consumers and producers.

The lead producer 508 is selected from the set of producers 504 and designated as the lead producer as a result of the lead producer 508 submitting a leadership request to the journal service 502 via the producer interface 522. The producer interface 522 forwards the request to the leader manager 528. The leadership request identifies a particular named cursor, and the leader manager 528 determines that the leadership role for the particular named cursor is not yet assigned. As a result, the leader manager 528 grants the leadership request and sends a grant notification to the lead producer 508 via the producer interface 522. After being granted leadership, journal entries submitted by the lead producer 508 are accepted by the journal service 502 and stored in the journal data store 520 by the journal manager 526. In some implementations, the journal service 502 advances the particular named cursor and sends a confirmation to the lead producer 508. In other implementations, the journal service 502 sends a confirmation to the lead producer 508. In response, the lead producer 508 sends a signal to the journal service 502 which causes the journal service 502 to advance the particular named cursor.

If the first alternate producer 510 submits a request for leadership to the journal service 502 after leadership has been granted to the lead producer 508, the leader manager 528 determines that leadership has already been granted to the lead producer 508, and denies the leadership request from the first alternate producer 510. If the first alternate producer 510 attempts to submit a journal entry to the journal service 502, the journal service 502 determines that the first alternate producer 510 has not been granted leadership over the named cursor indicated by the first alternate producer 510, and refuses any journal entries submitted by the first alternate producer 510.

The lead consumer 514 may be designated as the lead consumer by submitting a leadership request to the journal service 502 via the consumer interface 524. The leadership request identifies a particular named consumer cursor. The leader manager 528 receives the leadership request, and determines whether the leadership request should be granted. In some examples, the leader manager 528 grants a request for leadership when there is no current lead consumer associated with the requested named cursor. In additional examples, the leader manager 528 grants a request for leadership when the requesting consumer is preferred to the currently assigned lead consumer. In the example shown in FIG. 5, the leader manager 528 grants the leadership request, and confirms the grant of the request by sending a confirmation to the lead consumer 514. After being granted leadership, the lead consumer 514 is able to submit requests for journal entries to the journal service 502 and, in response, the journal service 502 is able to provide one or more journal entries to the lead consumer 514.

After the lead consumer 514 has been granted leadership in association with a particular named consumer cursor, leadership requests associated with the particular named cursor that originate from other consumers will generally be denied. If, for example, after leadership has been granted to the lead consumer 514, the first alternate consumer 516 submits a leadership request to the journal service 502, and the leadership request identifies the same consumer cursor as the leadership request submitted by the lead consumer 514, the journal service 502 will deny the leadership request from the first alternate consumer 516. If the first alternate consumer 516 requests a journal entry from the journal service 502 using the particular named cursor, journal entries will not be provided by the journal service 502 to the first alternate consumer 516.

The journal service 502 includes a journal management interface 530 that allows an administrator, a pipeline manager, or other entity to retrieve operational information associated with a journal service 502, and set operational parameters that influence the operation of the journal service 502. The journal management interface 530 may be an application programming interface, a web service interface, a remote procedure call interface, or other programmatically accessible interface. The operational information may include the values of production and consumption cursors maintained by the journal service 502, a number of journal entries in the journal data store 520, an amount of free storage space in the journal data store 520, a journal-entry backlog, and a journal-entry throughput. In some examples, the operational information includes information associated with a set of producers 504 and the set of consumers 506. In such examples, the operational information may include the identity of the lead producer 508, the identity of the lead consumer 514, or the identity of a hybrid entity that includes the lead consumer or lead producer. In some examples, the operational information includes the identity of alternate producers and consumers, journal-entry processing capacity measures for the lead producer 508 and the lead consumer 514, and reliability measures associated with a set of producers 504 in the set of consumers 506.

Figure 6:
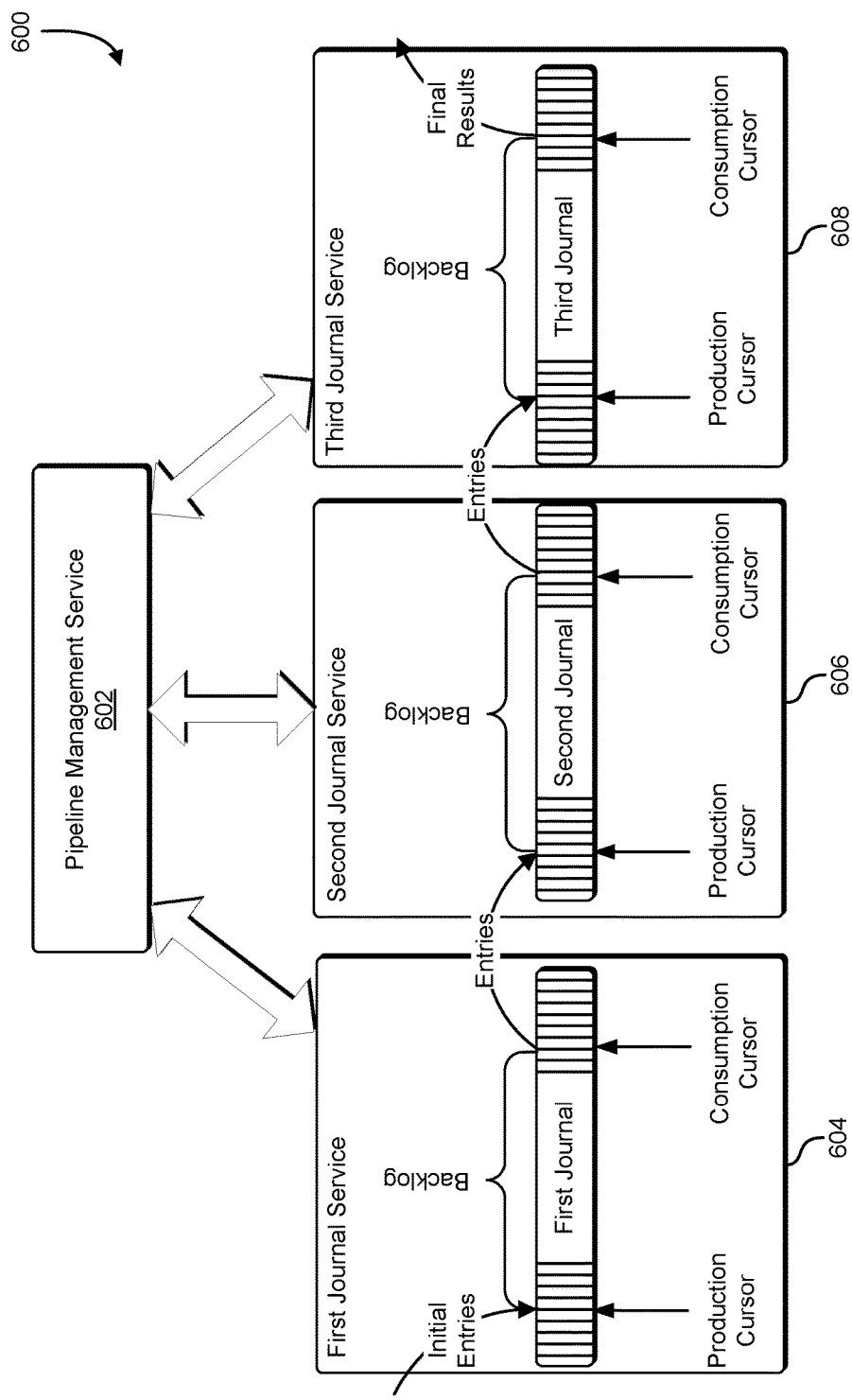
FIG. 6 shows an illustrative example of a pipeline management service that manages a processing pipeline made up of a set of journals linked together with a number of associated producers and consumers.

FIG. 6 shows an illustrative example of a pipeline management service that manages a processing pipeline made up of a set of journals linked together with a number of associated producers and consumers. A diagram 600 shows a pipeline management service 602 that manages a processing pipeline comprised of a first journal service 604, a second journal service 606, and a third journal service 608. Initial journal entries provided by an initial producer are submitted to the first journal service 604. The first journal service 604 stores the initial journal entries at a location indicated by the production cursor associated with the first journal service 604, and updates the production cursor in accordance with a number of initial journal entries received.

A first intermediate entity acquires the initial journal entries from the first journal service, processes the initial journal entries in accordance with applicable business logic, and produces intermediate journal entries which are submitted to the second journal service 606. The first journal service 604 provides the intermediate journal entries to the first intermediate entity. After the first intermediate entity processes the initial journal entries, the first intermediate entity sends a confirmation to the first journal service 604 which causes the first journal service 604 to update the consumption cursor in accordance with a number of initial journal entries provided to the first intermediate entity. The first intermediate entity generates a number of intermediate journal entries based on the received initial journal entries, and sends the intermediate journal entries to the second journal service 606. The second journal service 606 receives the intermediate journal entries and stores the intermediate journal entries at a location indicated by the production cursor associated with the second journal service 606. As a result of receiving the intermediate journal entries, the second journal service 606 updates the production cursor in accordance with a number of intermediate journal entries received.

A second intermediate entity acquires the intermediate journal entries from the second journal service, processes the intermediate journal entries in accordance with applicable business logic, and produces final journal entries which are submitted to the third journal service 608. The second journal service 606 provides the intermediate journal entries to the second intermediate entity. After the second intermediate entity processes the intermediate journal entries, the second intermediate entity sends a confirmation to the second journal service 606 which causes the second journal service 606 to update the consumption cursor in accordance with a number of intermediate journal entries provided to the second intermediate entity. The second intermediate entity generates a number of final journal entries based on the received intermediate journal entries, and sends the intermediate journal entries to the third journal service 608. The third journal service 608 receives the final journal entries and stores the final journal entries at a location indicated by the production cursor associated with the third journal service 608. As a result of receiving the final journal entries, the third journal service 608 updates the production cursor in accordance with a number of final journal entries received.

A pipeline management service 602 manages the operation of the pipeline by collecting operational information and setting operational parameters associated with individual journal services in the pipeline. The pipeline management service 602 communicates with the individual journal services via an application programming interface, a network interface, a remote procedure call, a shared memory interface, or inter-process communication interface. In some examples, the pipeline management service 602 uses means for communicating with the journal services that are implemented using a library of functions that support inter-process communication. Individual calls to the programming library establish connections between processes, exchange data between processes, and allow processes to discover each other. In additional implementations, means for communicating with the journal services may include a web services client coupled to a network interface card, and each journal service provides a web services interface that is accessible to the web services client. In some examples, the pipeline management service 602 queries individual journal services associated with the pipeline and acquires backlog information for each journal service. Using the backlog information, the pipeline management service 602 identifies a processing bottleneck. Using a model of the pipeline, the pipeline management service 602 changes operational parameters of one or more consumers and/or producers to alleviate the bottleneck.

The pipeline management service 602 may use various means for identifying a particular journal service that is associated with an inefficiency or processing bottleneck. In some examples, the pipeline management service 602 identifies a journal service associated with the largest backlog of journal events. In another example, the pipeline management service 602 identifies a journal service that has a backlog of journal events that is less than the threshold value. The threshold value may be zero, or a number of journal entries that suggests that downstream processing entities may be idle while waiting for journal entries to process. In yet another example, the pipeline management service 602 identifies a journal service that has an amount of free storage space less than the threshold amount. The threshold amount may be determined as an amount that indicates that the journal associated with the journal service is full, or that producers supplying the journal service may be waiting while downstream processing for downstream processing entities to empty the journal.

The pipeline management service 602 may use various means for identifying a particular journal-entry-processing entity that is causing the inefficiency or processing bottleneck. In some examples, the pipeline management service 602 queries the identified journal service for the identity of a consumer entity associated with the identified journal service. In another example, the pipeline management service 602 queries the identified journal service for the identity of a producer entity associated with the identified journal service. If the pipeline management service 602 determines that the identified journal service contains an excess of journal entries, the pipeline management service 602 may determine that a consumer associated with the identified journal service is not consuming sufficient journal entries, or that a producer associated with the identified journal service is not producing sufficient journal entries. If the pipeline management service 602 determines that the identified journal service contains a deficiency of journal entries, the pipeline management service 602 may determine that the consumer associated with the identified journal service is consuming journal entries at an excessive rate, or that a producer associated with the identified journal service is not producing journal entries at a sufficient rate. The pipeline management service 602 may identify consumers, producers, or hybrid entities associated with the identified journal service sending a request to the journal service via a journal interface, and receiving from the identified journal service, the requested information describing the consumers and producers that interact with the identified journal service.

The pipeline management service 602 may use various means for adjusting the operation of journal-anti-processing entities. In order to alleviate the bottleneck, the pipeline management service 602 may perform a number of actions. In some examples, the pipeline management service 602 promotes a more capable alternate resource to replace the consumer entity. In another example, the pipeline management service 602 allocates additional computing resources to the consumer entity. In yet another example, the pipeline management service 602 creates a new lead consumer entity having increased processing capability, and adds the new lead consumer entity to a resource pool associated with a consumer entity. In yet another example, the pipeline management service 602 submits an increased capability requirement to the journal service, and the journal service modifies the consumer entity to improve performance. In yet another example, the pipeline management service 602 splits the pipeline and creates a branch serviced by a new consumer, and a portion of the journal entries are redirected to the new consumer so that overall capacity of the pipeline is improved.

Figure 7:
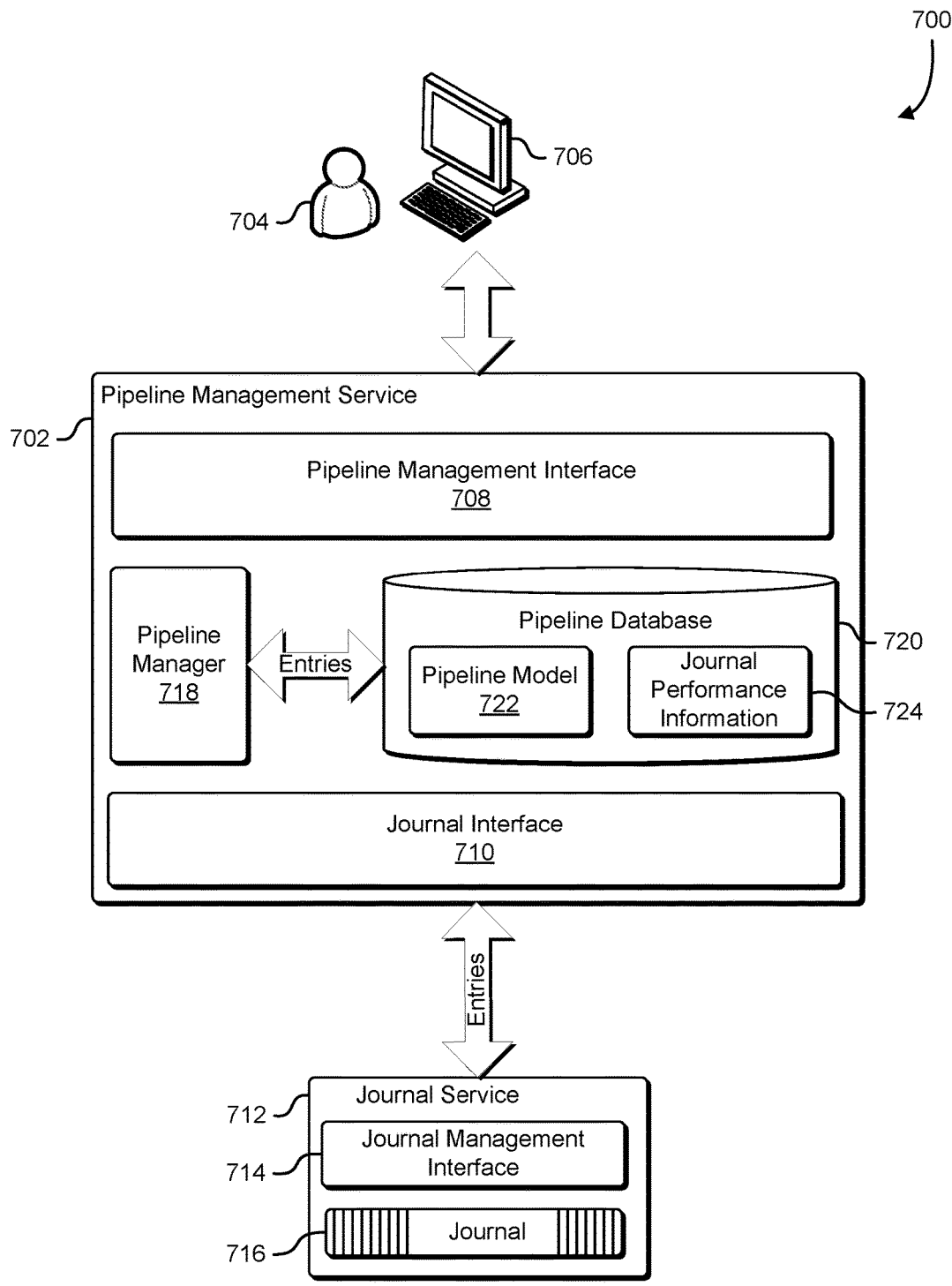
FIG. 7 shows an illustrative example of an architecture that implements a pipeline management service.

FIG. 7 shows an illustrative example of an architecture that implements a pipeline management service. A block diagram 700 shows a pipeline management service 702. The pipeline management service 702 is accessed by an administrator 704 via a pipeline management console 706. The pipeline management console 706 may be a personal computer, tablet device, cell phone, web browser, thin client, or other computing device having a display terminal and an input device. The pipeline management service 702 is a service running on a computer server, server cluster, or virtual computer system. The pipeline management service 702 includes a pipeline management interface 708 that allows the pipeline management service 702 to be accessed by the administrator 704. In various examples, the pipeline management interface 708 may be implemented using a programming API, a web interface, or a computer backplane. A journal interface 710 allows the pipeline management service 702 to communicate with a journal service 712 via the journal management interface 714. In some examples, the journal interface 710 and the journal management interface 714 operate using an interprocess communication mechanism and the journal service 712 and the pipeline management service 702 are hosted on a shared computer system. In another example, the journal interface 710 and the journal management interface 714 communicate via a network connection. The journal service 712 maintains a journal 716 that contains journal entries submitted by one or more producers and consumed by one or more producers.

The pipeline management service 702 includes a pipeline manager 718. The pipeline manager 718 uses the journal interface 710 to monitor a series of journal services associated with a processing pipeline. In some implementations, the pipeline manager 718 periodically queries individual journal services associated with the processing pipeline to acquire operational information associated with the individual journal services. In another implementation, the pipeline manager receives updates from the individual journal services containing the operational information. The operational information is stored in a pipeline database 720. The pipeline database may be implemented as an in memory data store, a relational database, or remote data store. The pipeline database 720 retains a pipeline model 722 and journal performance information 724. In some implementations, the pipeline model 722 is provided by the administrator 704. In another implementation, the pipeline model 722 is derived from information acquired from the journal services associated with the processing pipeline. In one example, the pipeline manager 718 acquires the identity of consumers and producers associated with the journal services. Identities of consumers and producers are matched to infer processing connections between individual journal services that define a processing pipeline. For example, if a first journal service has an associated consumer with an identity that matches the identity of a producer associated with a second journal service, the pipeline manager 718 infers a processing connection from the first journal service to the second journal service.

Figure 8:
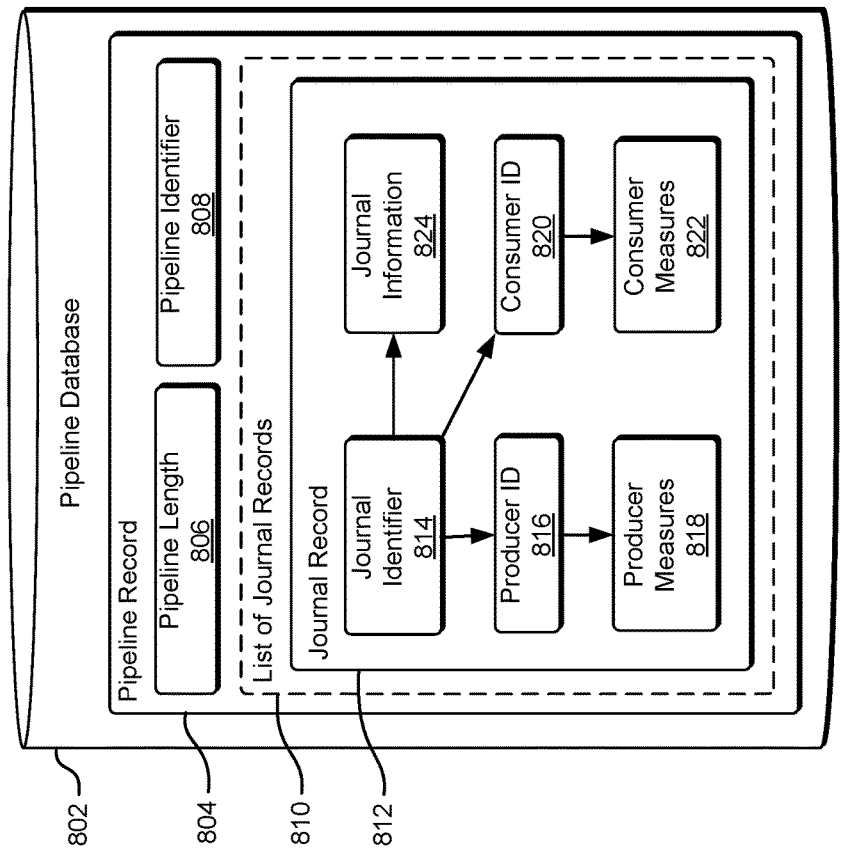
FIG. 8 shows an illustrative example of a pipeline database for storing a pipeline model that is comprised of one or more journals, and operational information associated with the one or more journals.

FIG. 8 shows an illustrative example of a pipeline database for storing a pipeline model that is comprised of one or more journals, and operational information associated with the one or more journals. A diagram 800 shows a set of data structures for holding information in a pipeline database 802. The pipeline database 802 is managed by a pipeline management service, and holds information related to one or more processing pipelines. A pipeline record 804 is maintained for an individual pipeline, and includes a pipeline length 806, a pipeline identifier 808, and a list of journal records 810. The pipeline length 806 holds a value that indicates the number of journal records associated with the pipeline record 804. The pipeline identifier 808 holds an identifier that allows an administrator to identify the pipeline when performing management operations. The list of journal records 810 may be maintained as an array, a linked list, a stack, or other ordered collection. The order of records within the list of journal records 810 indicates the order in which associated journal services are ordered in the pipeline. A journal record 812 includes a journal identifier 814, a producer ID 816, a collection of producer measures 818, a consumer ID 820, a set of consumer measures 822, and a set of journal information 824.

The journal identifier 814 includes an identifier associated with the journal such as a journal name. The journal identifier 814 is used as a key field, and is linked to the producer ID 816, the consumer ID 820, and the journal information 824. The producer ID 816 and the consumer ID 820 are identifiers associated with consumers and producers that retrieve journal entries from and supply journal entries to the associated journal service. The producer ID 816 is linked to the set of producer measures 818. The set of producer measures 818 may include a journal-entry processing capacity of the lead producer, a reliability of the producer pool, and the capacity and reliability requirements imposed by the administrator. The consumer ID 820 is linked to the set of consumer measures 822. The set of consumer measures 822 may include a journal-processing capacity of the lead consumer, a reliability of the consumer pool, and the capacity and reliability requirements imposed by the administrator for the consumers.

The journal information 824 includes information that the pipeline management service uses to identify processing bottlenecks and adjust the performance of the pipeline. The journal information 824 may include the values of consumption and production cursors for the journal service, the current backlog of journal entries for the journal service, and a rate at which a journal-entry backlog is increasing or decreasing.

Figure 9:
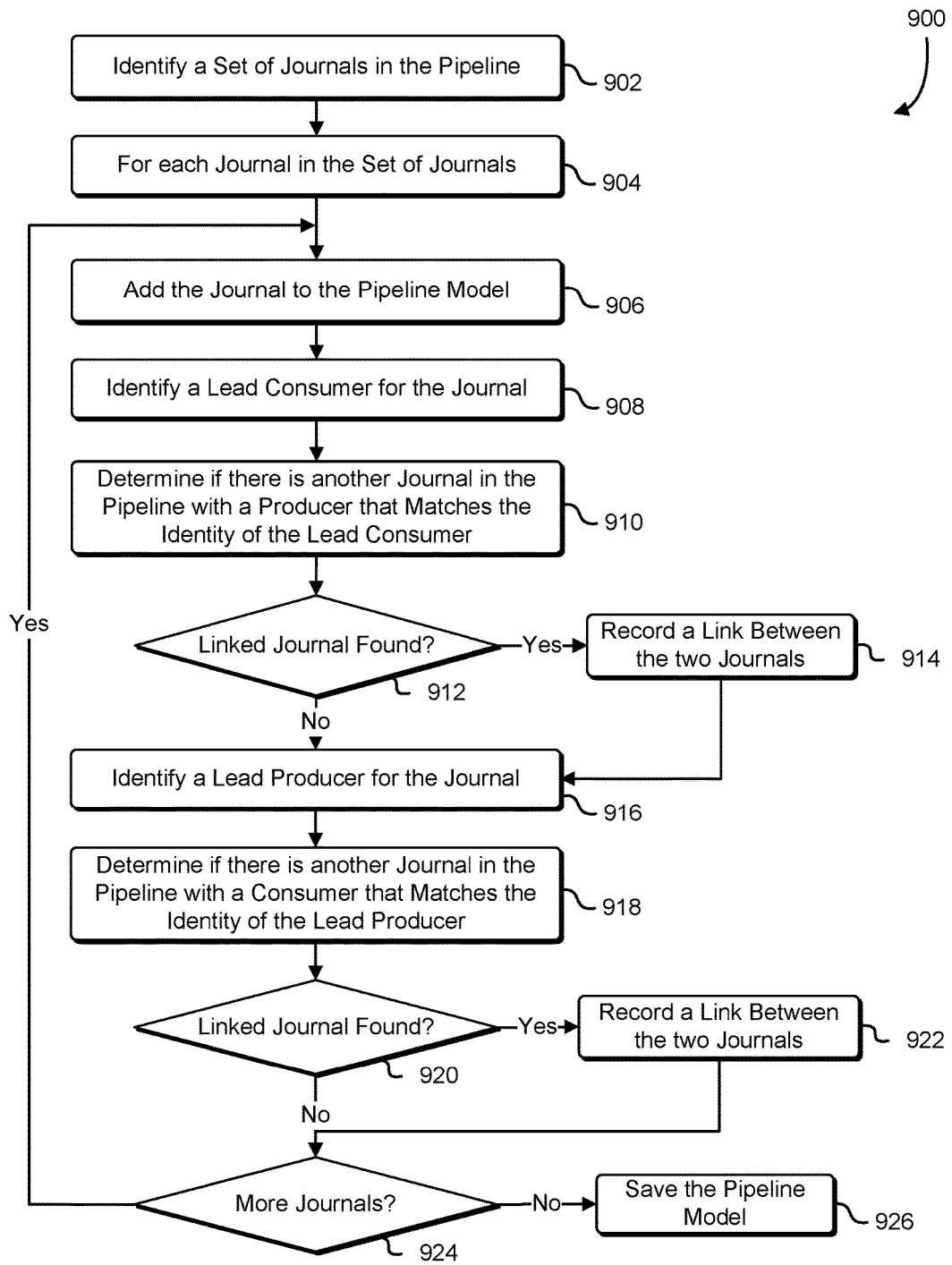
FIG. 9 shows an illustrative example of a process that, as a result of being performed by a pipeline management service, determines a pipeline model for analyzing the performance of the pipeline.

FIG. 9 shows an illustrative example of a process that, as a result of being performed by a pipeline management service, determines a pipeline model for analyzing the performance of the pipeline. A flowchart 900 illustrates a process that begins at block 902 with a pipeline management service identifying a set of journals that are used to link together segments of a processing pipeline. In some implementations, the set of journals are specified by an administrator using an administrative console. In another implementation, the set of journals is identified by broadcasting a query packet over a computer network. Journal services connected to the computer network detect the query packet, and respond with an identification message to the pipeline management service. The identification message may include identifying information for the pipeline, as well as contact information such as a network address and port information that allow the pipeline management service to initiate additional communications with the journal service.

At block 904, the pipeline management service initiates a loop that iterates over each journal service in the set of journal services. For each individual journal service in the set of journal services, the pipeline management service adds 906 a journal record associated with the individual journal service to a pipeline model retained in a pipeline database accessible to the pipeline management service. The journal record includes information associated with the individual journal service such as the identity of the journal service, and the identities of any consumer or producer entities that are authorized to interact with the individual journal service. At block 908, the pipeline management service contacts the individual journal service and retrieves the identity of an entity granted the role of lead consumer for the individual journal service. In some examples, the identity of the associated lead consumer is the identity of a hybrid entity that performs lead consumer and or lead producer roles for other journal services. In other examples, the identity of the associated lead consumer is the identity of a final service at the end of the pipeline. At block 910, the pipeline management service examines other journal records in the pipeline model, and attempts to identify another journal service that has a lead producer entity that matches the identified lead consumer of the individual journal service. At decision block 912, if another journal service is found with a lead producer that matches the lead consumer of the individual journal service, execution advances to block 914 where the pipeline management service records a link between the individual journal service and the identified other journal service. The link may be established by placing the individual journal service and the additional journal service in an ordered memory array, configuring complementary links between the journal records associated with the individual journal service and the additional journal service, or generating and retaining a link record that records the link between the individual journal service and the additional journal service. After recording the link, execution advances to block 916.

If the pipeline management service does not locate an additional journal service having a lead producer that matches the lead consumer of the individual journal service, execution advances to block 916. At block 916, the pipeline management service contacts the individual journal service and retrieves the identity of an entity granted the role of lead producer for the individual journal service. In some examples, the identity of the associated lead producer is the identity of a hybrid entity that performs lead producer and/or lead consumer roles for other journal services. In other examples, the identity of the associated lead producer is the identity of an initial service at the beginning of the pipeline. At block 918, the pipeline management service examines other journal records in the pipeline model, and attempts to identify another journal service that has a lead consumer entity that matches the identified lead producer of the individual journal service. At decision block 920, if another journal service is found with a lead consumer that matches the lead producer of the individual journal service, execution advances to block 922 where the pipeline management service records a link between the individual journal service and the identified other journal service. The link may be recorded by placing the individual journal service and the additional journal service in an ordered memory array, configuring complementary links between the journal records associated with the individual journal service and the additional journal service, or generating and retaining a link record that records the link between the individual journal service and the additional journal service. After recording the link, execution advances to decision block 924.

At decision block 924, the pipeline management service determines whether there are additional journal services to be examined. If there are additional journal services to be examined, execution returns to block 906 and the next journal services examined. If there are not additional journal services to be examined, execution advances to block 926 and the pipeline management service saves the determined pipeline model. After completion of the process described above, provided that the journal services are connected via a hybrid consumer/producer entity, the pipeline model may be used as an internal representation of the processing pipeline.

Means for identifying journal services within the processing pipeline may be implemented using a computer system containing executable instructions that, when executed, perform the process illustrated in FIG. 9. In additional implementations, the means for identifying journal services contacted the journal services by broadcasting a message or a communication medium which the journal services are connected. In yet another implementation, the means for identifying journal services is an interface to a pipeline management console, and information identifying the journal services is provided by an administrator via the pipeline management console.

Figure 10:
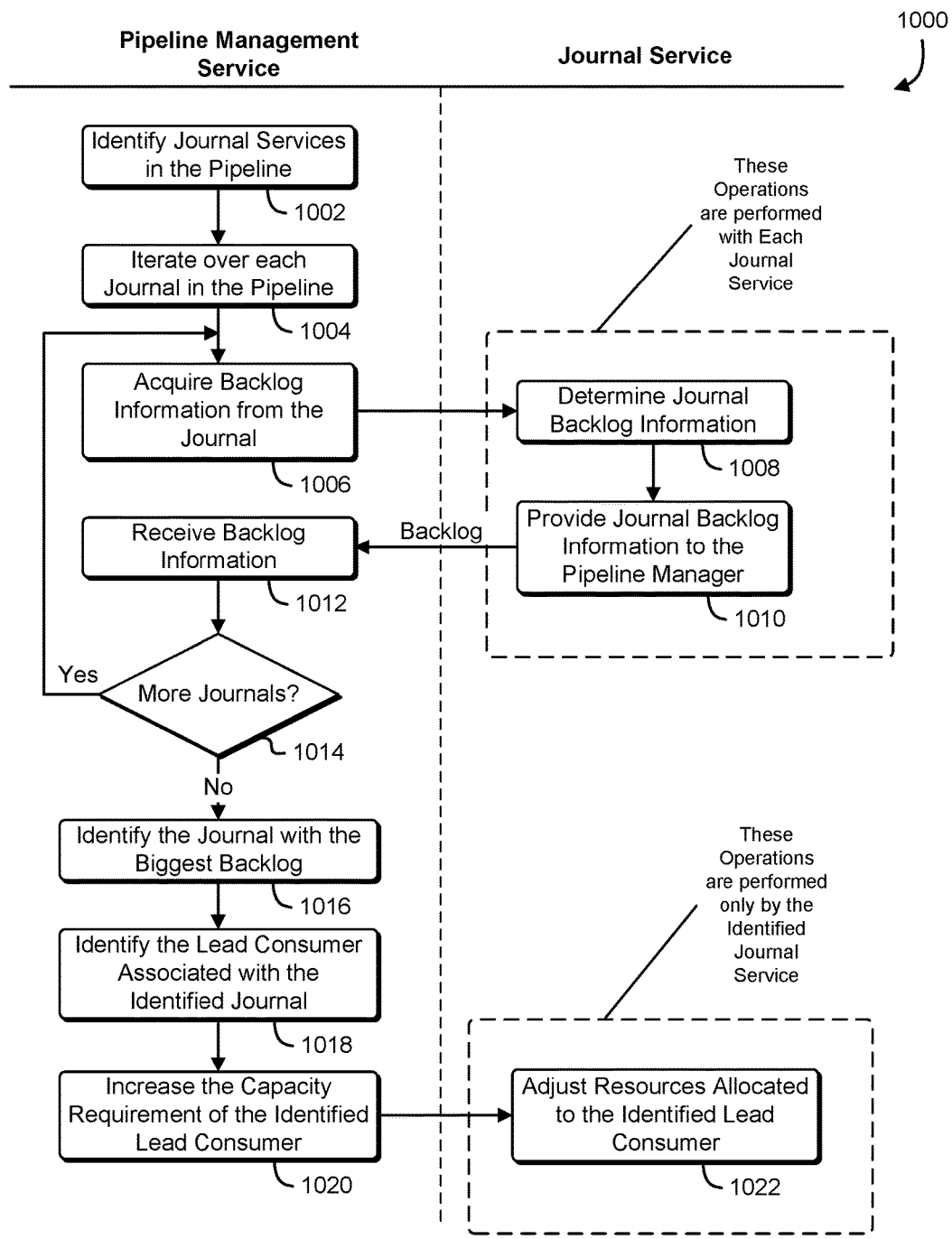
FIG. 10 shows an illustrative example of a process that, as a result of being performed by a pipeline management service and one or more journal services, identifies a performance bottleneck in the pipeline, and adjusts the performance requirements of a journal service associated with the bottleneck.

FIG. 10 shows an illustrative example of a process that, as a result of being performed by a pipeline management service and one or more journal services, identifies a performance bottleneck in the pipeline, and adjusts the performance requirements of a journal service associated with the bottleneck. A swim diagram 1000 shows a process that begins at block 1002 with a pipeline management service identifying a set of journals associated with the processing pipeline. In some examples, the set of journals may be identified by sending a broadcast query over a communication medium shared by one or more journal services. The individual journal services respond to the broadcast query by providing identifying information and contact information to the pipeline management service. In another example, the set of journals is identified by examining a pipeline model, such a pipeline model generated using the process illustrated in FIG. 9.

At block 1004, the pipeline management service initiates a loop that iterates over each individual journal service in the pipeline. In some examples, the pipeline management service iterates over the journal services in order from the beginning of the pipeline to the end of the pipeline. For each individual journal service, the pipeline management service acquires backlog information from the individual journal service. The backlog information may be represented as a number of journal entries currently received but not yet provided to a consumer service, as a number of consumer and producer cursor values, or as an amount of free storage space available for storing journal entries. In some examples, the backlog information is acquired by making a remote procedure call to individual journal services. In another example, the backlog information is acquired by sending a query to individual journal services. In yet another example, the backlog information is acquired by sending a broadcast query to a group of journal services connected to a shared communication medium, and receiving responses from each journal service in the group of journal services.

At block 1008, a particular journal service receives an inquiry from the pipeline management service requesting backlog information. The journal service receives the request and acquires the backlog information by examining the journal maintained by the journal service. In some examples, the journal service retrieves the value of a production cursor and the value of a consumption cursor, and determines the difference to acquire a number that represents a backlog of journal entries. In another example, the journal service retrieves an amount of storage space used by journal entries in the journal, and uses the amount of storage space as a representation of the backlog. In yet another example, the journal service has more than one associated production cursor or more than one associated consumption cursor, and the backlog information includes a number of backlogs for each associated cursor. For example, if the journal service has a first consumption cursor, a second consumption cursor, and a third consumption cursor, but only one production cursor, the backlog information may include a first backlog determined by the difference between the first consumption cursor and the production cursor, a second backlog determined by the difference between the second consumption cursor and the production cursor, and a third backlog determined by the difference between the third consumption cursor and the production cursor. Each individual backlog information may be returned to the pipeline management service in association with an identifier of the associated cursor. At block 1010, the journal service provides the backlog information to the pipeline management service.

At block 1012, the pipeline management service receives the backlog information from the journal service. The received backlog information is retained in a pipeline database in association with the identity of the journal service from which the backlog information was received. At decision block 1014, the pipeline management service determines if there are more journal services to be processed, and if there are more journal services to be processed, execution returns to block 1006 and to the pipeline management service acquires backlog information from the next journal service. If there are not more journal services to be processed, execution advances to block 1016 and the pipeline management service identifies, based at least in part on the backlog information, a particular journal service that is a processing bottleneck for the pipeline. In some examples, the particular journal service is identified by identifying the journal service associated with the largest backlog of journal entries. In some examples, the particular journal services identified by identifying the journal service having the least available free space for storing journal entries. At block 1018, the pipeline management service identifies a particular lead consumer associated with the particular journal service as the cause of the bottleneck. If the particular journal services associated with a single lead consumer, the lead consumer is identified as the cause of the bottleneck. If the particular journal service is associated with backlog information from multiple consumer cursors, the consumer cursor associated with the largest backlog is identified as the cause of the bottleneck.

Once the cause of the bottleneck is identified, the pipeline management service, in coordination with the particular journal service, may make adjustments to the pipeline to improve performance. In the example shown in FIG. 10, at block 1020, the journal service is capable of managing the capacity of producers and consumers associated with the journal service in accordance with a capacity requirement specified by a journal management interface. The pipeline management service contacts the journal service associated with the bottleneck, and increases a capacity requirement of the identified consumer. At block 1022, the journal service, in response to the increased capacity requirement adjusts computing resources allocated to the identified consumer. In some implementations, the journal service replaces the lead consumer with an alternate lead consumer having higher journal-processing capacity. In another implementation, the journal service increases computing resources allocated to the current lead consumer. If the current lead consumer is hosted by an online service provider, the journal service may increase computing resources allocated to the current lead consumer by communicating the increased capacity requirement to the online service provider. In yet another implementation, the journal service increases computing resources allocated to the current lead consumer by creating a new consumer resource with higher performance requirements, and replacing the current lead consumer with a new consumer resource.

Means for retrieving operational information from the journal services may include an inter-process communication library, a remote procedure call library, or a network service interface implemented by executable instructions that, when run on a processor, allow the pipeline management service to communicate with complementary interfaces implemented by the journal services. In some examples, the means for a retrieving operational information is a shared memory space accessible to both the pipeline management service and the journal services. In another example, the means for retrieving operational information includes a network interface over which information may be exchanged between the pipeline management service and the journal services.

Figure 11:
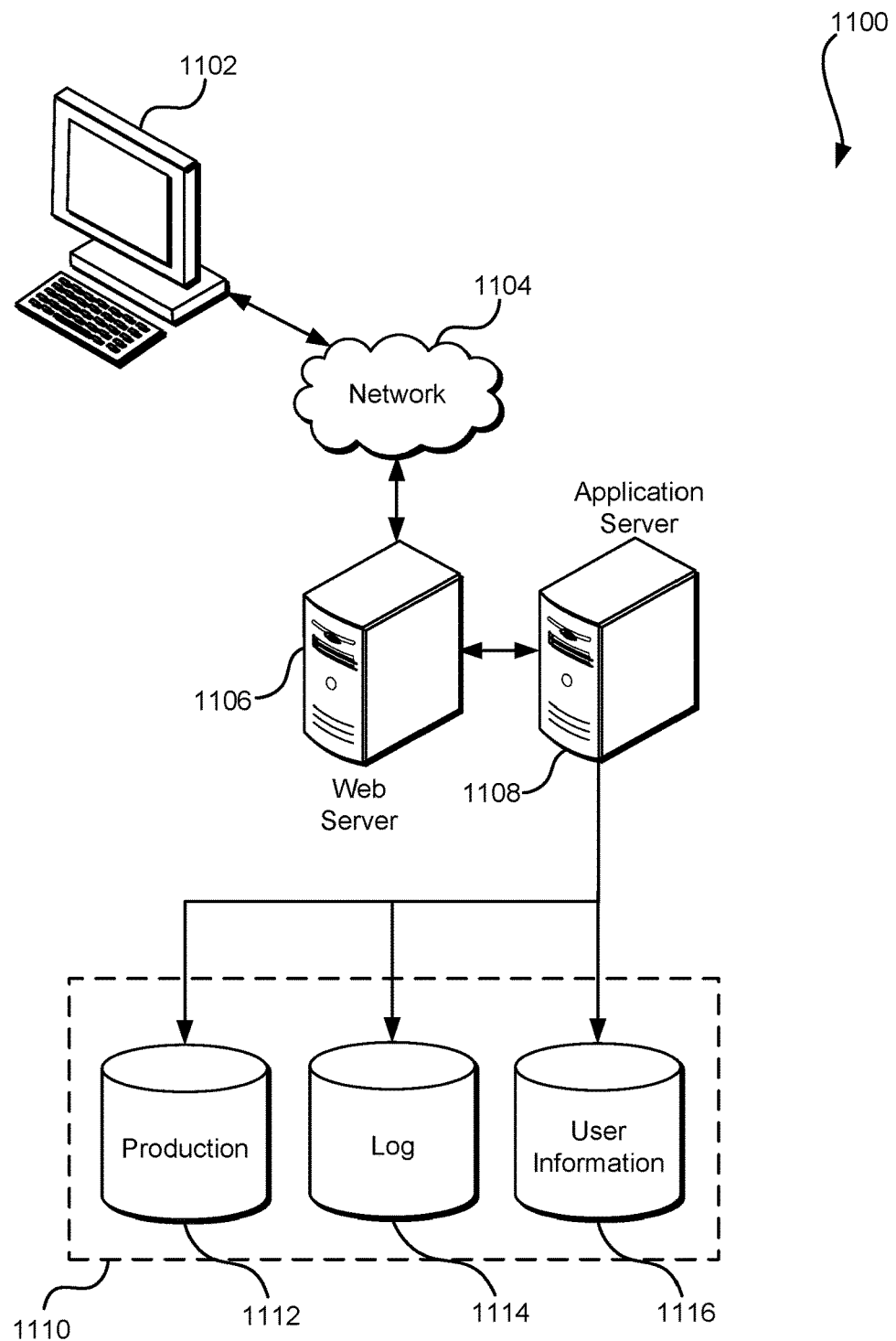
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any approproate files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital certificates may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   identifying a plurality of journal services, the plurality of journal services configured with a collection of producer services and consumer services to form a processing pipeline, the processing pipeline generating and consuming journal entries that are retained by individual journal services in the plurality of journal services;
   acquiring backlog information for individual journal services in the plurality of journal services, the backlog information for an individual journal service describing a count of journal entries retained by the individual journal service;
   determining, based at least in part on the backlog information, that a particular journal service in the plurality of journal services is retaining a larger backlog of journal entries than other journal services in the plurality of journal services;
   identifying a consumer service that is associated with the particular journal service, the consumer service consuming journal entries associated with the larger backlog of journal entries; and
   causing a journal-consuming capacity of the consumer service to be increased.

2. The computer-implemented method of claim 1, wherein the plurality of journal services is identified at least in part by:
   broadcasting a discovery message via a communication medium connected to the plurality of journal services;
   receiving responses from individual journal services in the plurality of journal services, the responses identifying the individual journal services, and the responses providing association information that links individual journal services to at least one of the consumer services and at least one of the producer services; and
   assembling a pipeline model that represents the processing pipeline based at least in part on the association information.

3. The computer-implemented method of claim 1, further comprising:
   acquiring, from the particular journal service, a capacity parameter associated with the consumer service;
   increasing the capacity parameter to produce a new capacity parameter; and
   providing the new capacity parameter to the particular journal service.

4. The computer-implemented method of claim 1, wherein:
   the consumer service is integrated with a producer service to form a hybrid entity;
   the consumer service retrieves journal entries from the particular journal service; and
   the producer service provides journal entries to another journal service.

5. A system, comprising at least one computing device configured to implement a pipeline management service, wherein the pipeline management service is configured to:
   identify a set of journal services associated with a processing pipeline, individual journal services in the set of journal services associated with one or more journal-entry-processing entities;
   retrieve operational information associated with individual journal services in the set of journal services;

identify, based at least in part on the operational information, a particular journal service in the set of journal services that is associated with an inefficiency in the processing pipeline;

identify, from a set of journal-entry-processing entities associated with the particular journal service, a particular journal-entry-processing entity that is causing the inefficiency in the processing pipeline; and adjust the operation of the particular journal-entry-processing entity so that an effect of the inefficiency is reduced.

6. The system of claim 5, wherein the pipeline management service is further configured to:

identify a journal-entry-processing entity that is not a cause of the inefficiency in the processing pipeline; and provide, to a resource manager responsible for managing the operation of the journal-entry-processing entity; a signal that prevents the resource manager from modifying operational parameters associated with the journal-entry-processing entity.

7. The system of claim 5, wherein:

the particular journal-entry-processing entity is a pool of resources;

the pool of resources includes a lead resource and one or more alternate resources; and performance and reliability of the pool of resources is controlled by a resource manager.

8. The system of claim 7, wherein:

the resource manager is the particular journal service; and the pipeline management service is further configured to adjust the operation of the particular journal-entry-processing entity at least by commanding the particular journal service to increase the performance of the journal-entry-processing entity.

9. The system of claim 5, wherein the operational information includes information that describes a count of journal entries for individual journal services in the set of journal services.

10. The system of claim 5, wherein the set of journal services are identified at least in part by:

acquiring a pipeline model that represents the processing pipeline, the pipeline model including a set of journal records corresponding to the set of journal services and individual journal records identifying one or more journal-entry-processing entities; and retaining the pipeline model in a pipeline database accessible to the pipeline management service.

11. The system of claim 10, wherein:

the pipeline management service includes a pipeline management interface; and the pipeline model is acquired at least in part by receiving, from an administrator via an administrative console, information that describes the processing pipeline via the pipeline management interface.

12. The system of claim 10, wherein the pipeline model is acquired at least in part by:

identifying journal-entry consumers and journal-entry producers associated with individual journal services in the set of journal services; and inferring processing connections between different journal services based at least in part on presence of matching associated consumers and producers.

13. A computer system coupled to a non-transitory computer-readable storage medium having stored thereon executable instructions that, as a result of being executed by one or more processors, implements a pipeline management service comprising:

means for identifying a set of journal services associated with a processing pipeline, individual journal services in the set of journal services associated with one or more journal-entry-processing entities;

means for retrieving operational information associated with individual journal services in the set of journal services;

means for identifying, based at least in part on the operational information, a particular journal service in the set of journal services that is associated with an inefficiency in the processing pipeline;

means for identifying, from a set of journal-entry-processing entities associated with the particular journal service, a particular journal-entry-processing entity that is causing the inefficiency in the processing pipeline; and means for adjusting the operation of the particular journal-entry-processing entity that reduces an effect of the inefficiency.

14. The computer system of claim 13, wherein:

the operational information associated with individual journal services is information that describes a count of journal entries retained by the individual journal services;

the inefficiency in the processing pipeline is identified in part by determining a count of journal entries associated with the particular journal service is lower than a count of journal entries associated with a previous journal service in the processing pipeline;

the particular journal-entry-processing entity is a consumer resource associated with the particular journal service; and the operation of the particular journal-entry-processing entity is adjusted by reducing journal-entry processing capability of the particular journal-entry-processing entity.

15. The computer system of claim 13, wherein the pipeline management service further comprises means for communicating with the set of journal services.

16. The computer system of claim 15, wherein:

the means for communicating with the set of journal services is a web service client; and individual journal services in the set of journal services include a web service interface.

17. The computer system of claim 13, wherein:

the operational information includes a rate at which journal entries are provided to the individual journal services; and the operational information includes a rate at which journal entries are extracted from the individual journal services.

18. The computer system of claim 13, wherein:

the operational information includes an amount of free storage space available for storage of journal entries by each journal service in the set of journal services; and the means for identifying the particular journal service comprises executable instructions stored in the non-transitory computer-readable storage medium that, as a result of being executed by one or more processors, determines that the amount of free storage space available to the particular journal service is below a threshold amount of free storage space.

19. The computer system of claim 13, wherein:

the operational information includes a count of journal entries retained by each journal service in the set of journal services; and the means for identifying the particular journal service comprises executable instructions stored in the non-transitory computer-readable storage medium that, as a result of being executed by one or more processors, determines that the count of journal entries associated with the particular journal service is below a threshold value count of journal entries.

20. The computer system of claim 13, wherein:

the operational information includes a count of journal entries retained by each journal service in the set of journal services; and the means for identifying the particular journal service comprises executable instructions stored in the non-transitory computer-readable storage medium that, as a result of being executed by one or more processors, determines that the particular journal service retains the greatest number of journal entries of the journal services in the set of journal services.

* * * * *